US009428651B2

(12) United States Patent
Ganguli et al.

(10) Patent No.: US 9,428,651 B2
(45) Date of Patent: Aug. 30, 2016

(54) FOULING AND STICTION RESISTANT COATING

(71) Applicant: TELEDYNE SCIENTIFIC & IMAGING, LLC, Thousand Oaks, CA (US)

(72) Inventors: Rahul Ganguli, Oak Park, CA (US); Vivek Mehrotra, Simi Valley, CA (US); Young J. Chung, Calabasas, CA (US); J. Eric Henckel, Houston, TX (US)

(73) Assignee: TELEDYNE SCIENTIFIC & IMAGING, LLC, Thousand Oaks, CA (US)

( * ) Notice: Subject to any disclaimer, the term of this patent is extended or adjusted under 35 U.S.C. 154(b) by 215 days.

(21) Appl. No.: 13/828,689

(22) Filed: Mar. 14, 2013

(65) Prior Publication Data

US 2014/0065370 A1    Mar. 6, 2014

Related U.S. Application Data

(60) Provisional application No. 61/694,401, filed on Aug. 29, 2012.

(51) Int. Cl.
*C09D 5/16* (2006.01)

(52) U.S. Cl.
CPC ........... *C09D 5/1662* (2013.01); *C09D 5/1681* (2013.01); *C09D 5/1693* (2013.01); *Y10T 428/24405* (2015.01)

(58) Field of Classification Search
CPC .... C09D 5/16; C09D 5/1606; C09D 5/1681; C09D 5/1662; C09D 5/1693; C09D 5/1675; B63B 59/04; G01V 1/201; Y10T 428/24405
USPC ............ 428/141, 143, 144, 147, 421, 423.1, 428/425.5, 446, 447
See application file for complete search history.

(56) References Cited

U.S. PATENT DOCUMENTS

| | | | |
|---|---|---|---|
| 5,902,851 A * | 5/1999 | Yamaki et al. ............... | 524/506 |
| 2002/0150726 A1* | 10/2002 | Nun et al. ..................... | 428/143 |
| 2007/0201307 A1* | 8/2007 | Lobe et al. .................... | 367/20 |
| 2011/0212333 A1* | 9/2011 | Maliverney et al. ......... | 428/447 |

FOREIGN PATENT DOCUMENTS

WO    WO 2009156609 A2 * 12/2009

* cited by examiner

*Primary Examiner* — Nancy Johnson
(74) *Attorney, Agent, or Firm* — Koppel, Patrick, Heybl & Philpott

(57) ABSTRACT

A fouling and stiction-resistant coating suitable for use with marine streamers is made from a silicone undercoat layer and a powdery topcoat layer. The powdery topcoat layer is preferably a non-toxic fluoropolymer which has a low surface energy, a high modulus, and which is not continuous. There may also be a primer layer below the silicone undercoat layer. The powdery topcoat layer is preferably arranged to be penetrable by the feet of barnacles that come into contact with it, with the silicone undercoat layer arranged such that the barnacles' feet that penetrate the powdery topcoat layer bond with the silicone undercoat layer. The powdery topcoat layer is preferably further arranged to peel away from the silicone undercoat layer when force is applied to the barnacles to remove them from the coating.

20 Claims, 4 Drawing Sheets

| Property | Pure polyurethane | Silastic T-2 | Present coating |
|---|---|---|---|
| Critical Removal Stress (N/mm$^2$) | High (animal may shatter) | 0.15 | 0.16 |
| Settlement rate (%) | 10 | 50 | 10 |
| Toxicity (Mortality of brine shrimp, %) | <1 | <1 | <1 |
| Stiction force (N) | 0.5 | 1.2 | 0.5 |

FIG. 4

FOULING AND STICTION RESISTANT COATING

RELATED APPLICATIONS

This application claims the benefit of provisional patent application No. 61/694,401 to Ganguli et al., filed Aug. 29, 2012.

BACKGROUND OF THE INVENTION

1. Field of the Invention

This invention relates to the field of marine cables, and particularly to methods for making such cables resistant to fouling and stiction.

2. Description of the Related Art

There are numerous situations in which surfaces immersed in bodies of water such as the ocean become fouled by marine life. One such situation involves the use of 'marine streamers'—i.e., long cables that are deployed in the ocean and used for seismic exploration. Typically, streamers (which can be 75 meters long or more) are spooled for transportation to ships, and are unspooled when ready to be used. A typical example of a spooled steamer cable 10 is shown in FIG. 1.

However, once unspooled into the ocean, streamer cables are susceptible to fouling, especially from barnacles 12; this is seen in FIG. 2. One way to combat this is to apply a toxic coating on the streamer. However, such coatings may be subject to complex regulations.

Another approach is to use a sticky, soft—but non-toxic—coating on the streamer. An example would be the silicone-based coatings current gaining market acceptance as non-toxic ship hull coatings. However, such coatings can lead to a 'self stiction' problem in which sections of the streamer stick to each other when the streamer is spooled, thereby damaging the coating.

Barnacle fouling of streamer cables is a serious problem in high fouling waters. There is a need for a non-toxic coating which resists fouling, without adversely affecting spooling.

SUMMARY OF THE INVENTION

A fouling and stiction-resistant coating is presented which overcomes the problems noted above.

The present coating comprises a silicone undercoat layer and a powdery topcoat layer on the silicone undercoat layer, adapted for application to a surface which is subject to fouling. The powdery topcoat layer is preferably a non-toxic fluoropolymer which inhibits the rate of colonization of barnacles, has a low surface energy, a high modulus, and which is not continuous. There may also be a primer layer below the silicone undercoat layer.

The powdery topcoat layer is preferably arranged to be penetrable by the feet of barnacles that come into contact with it, and the silicone undercoat layer is preferably arranged such that at least some of the barnacles' feet that penetrate the powdery topcoat layer bond with said silicone undercoat layer. The powdery topcoat layer is preferably further arranged to peel away from the silicone undercoat layer when force is applied to the barnacles to remove them from the coating.

One suitable application for the present coating is on marine streamers, where the coating serves to reduce stiction while also providing a means of resisting fouling.

Further features and advantages of the invention will be apparent to those skilled in the art from the following detailed description, taken together with the accompanying drawings.

BRIEF DESCRIPTION OF THE DRAWINGS

FIG. 4 is a table comparing several characteristics of the present coating with other known coatings.

DETAILED DESCRIPTION OF THE INVENTION

The present invention is directed to a two layer coating, with a powdery topcoat layer and a silicone undercoat layer. The coating could be used on any surface which is subject to fouling, but is particular well-suited for use on marine streamers.

Figure 1:
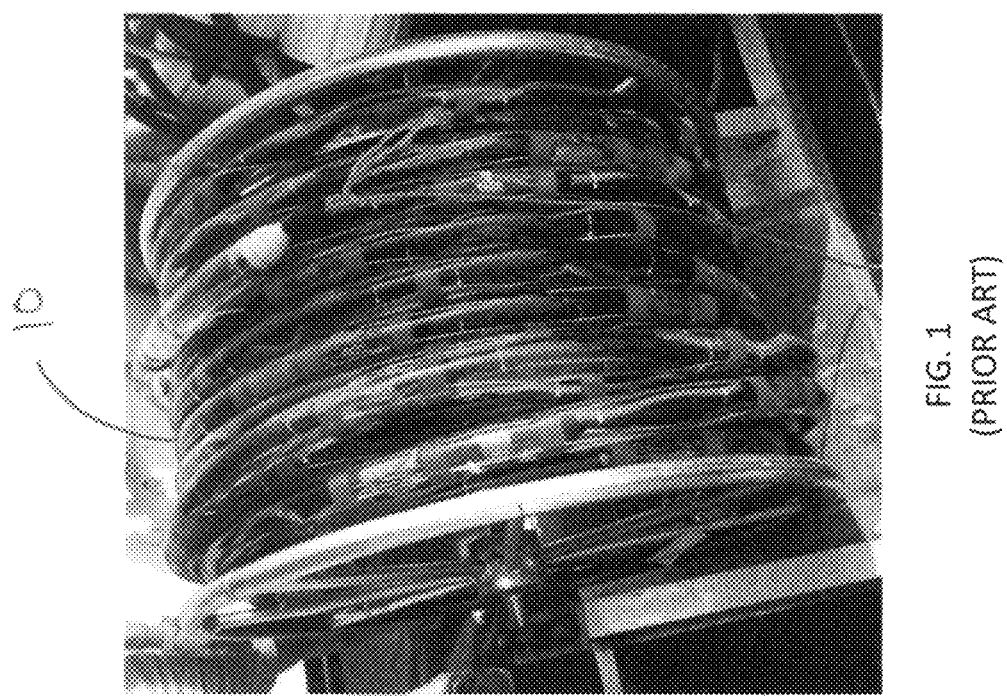
FIG. 1 is a view of a typical spooled streamer cable.
Figure 2:
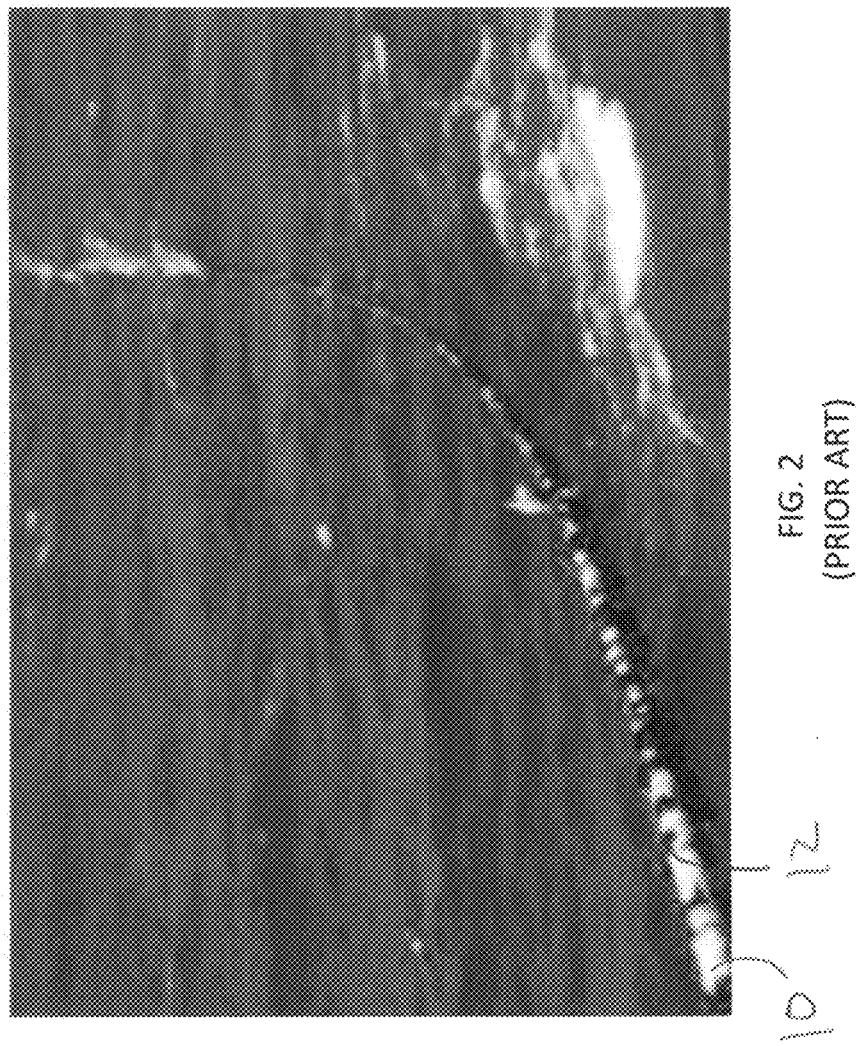
FIG. 2 is a view of a typical unspooled streamer cable which is fouled with barnacles.
Figure 3:
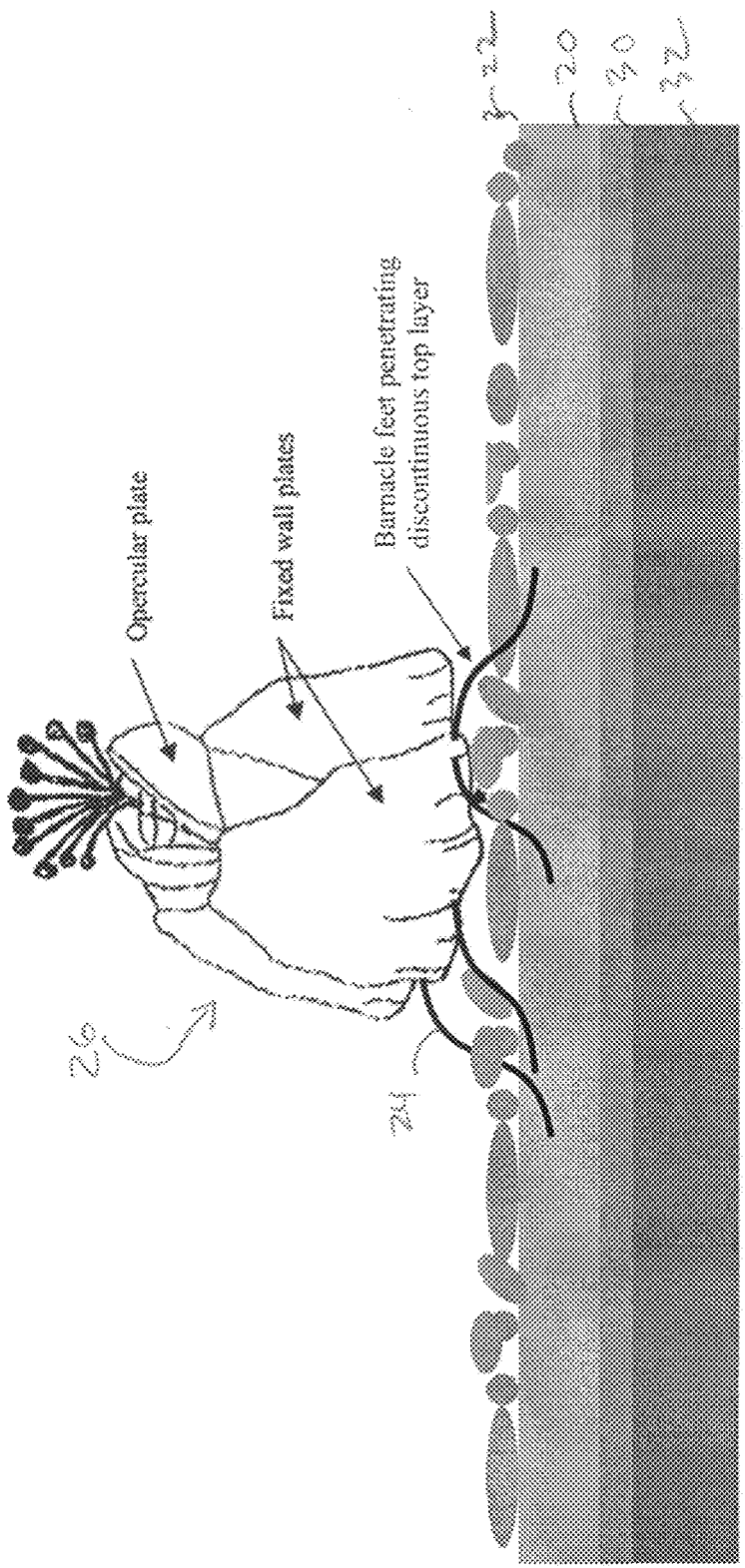
FIG. 3 is a diagram of a fouling and stiction-resistant coating per the present invention.

A sectional view of an exemplary embodiment of the present coating is shown in FIG. 3. The coating comprises a silicone undercoat layer 20 adapted for application to a surface that is subject to fouling, and a powdery topcoat layer 22 on the silicone undercoat layer.

When used as a coating for a marine streamer, powdery topcoat layer 22 is preferably arranged to be penetrable by the feet 24 of barnacles 26 that come into contact with the topcoat, and silicone undercoat layer 20 is preferably arranged such that at least some of the barnacles' feet that penetrate the powdery topcoat layer bond with the silicone undercoat layer. Powdery topcoat layer 22 is preferably further arranged to peel away from silicone undercoat layer 20 when force is applied to barnacles 26 to remove them from the coating (and the streamer to which the coating is applied). By providing a means of easily removing barnacles, the coating is resistant to fouling. Arranging the coating as described herein results in low release stress for the settled barnacles, and also minimizes erosion and stiction between streamer sections when spooled.

Powdery topcoat layer 22 is preferably a loosely adhered fluoropolymer—preferably a tetrafluoropolymer—which has a low surface energy, a high modulus, and is not continuous. The topcoat layer is also preferably non-toxic, non-uniform and highly hydrophobic. The topcoat layer is suitably a particulate form of fluoropolymer, such as polytetrafluoroethylene (PTFE) (Teflon), fluorinated ethylene propylene (FEP), polyfluoroalkoxy (PFA), ethylene tetrafluoroethylene (ETFE), or ethylene chlorotrifluoroethylene (ECTFE). Powdery topcoat layer 22 preferably has a thickness of 100 nm-1 micron.

Silicone undercoat layer 20 is preferably soft, and suitably comprises a UV-cured silicone, a room temperature-cured silicone (RTV), or a thermally cured silicone, with a thickness of 50 microns-500 microns.

The present coating may further include a primer layer 30 under silicone undercoat layer 20, which serves to improve the adhesion of the silicone layer, and therefore the entire coating, to the underlying substrate. Such a primer layer suitably comprises an epoxy-modified siloxane, with a thickness of 10 nm-10 microns.

The present coating may further include a substrate layer 32 under silicone undercoat layer 20, and under primer layer 30 if present. The substrate layer suitably comprises polyurethane, and has a thickness of 1 mm-1 cm. Typically, the substrate is the skin of the streamer cable.

As noted above, the present coating is well-suited for application to the surface of a cable, and is particular beneficial when used with a marine streamer: the use of a soft silicone undercoat and a loosely adhered powdery topcoat layers act to simultaneously reduce stiction between streamer sections when the streamer is spooled, and to enable the powdery topcoat layer to be easily peeled away from the silicone undercoat layer thereby making fouling easy to deal with. A fluoropolymer topcoat also acts to inhibit the rate of colonization of barnacles, Once peeled away, a new powdery topcoat layer can be applied to the streamer when it is brought back onboard the ship, and then the streamer may be redeployed.

Barnacles are typically removed from a streamer by shear stress. By employing a coating as described herein, some or all of the barnacles may be removed from the streamer just due to the drag force of the flowing water.

A coating as described herein has been established to have an extremely low toxicity. The present coating also shows extremely low 'settlement'—i.e., the rate of barnacle colonization in marine conditions—lower than polyurethane and commercial foul release coating SILASTIC™ T-2 from Dow Corning. At the same time, the critical removal stress characteristic of the present coating is similar to that of SILASTIC™ T-2. The stiction force is similar to that of polyurethane, being on the order of 0.5N. In contrast, the stiction force for the commercial foul release coating SILASTIC™ T-2 is more than two times higher under identical conditions.

A comparison of critical removal stress, settlement rate, toxicity and stiction force achievable for the present coating versus other non-toxic coatings (Silastic T-2 and pure polyurethane) is presented in FIG. 4. As can be seen, the present coating's characteristics are comparable to or better than those achievable with the known coatings.

While particular embodiments of the invention have been shown and described, numerous variations and alternate embodiments will occur to those skilled in the art. Accordingly, it is intended that the invention be limited only in terms of the appended claims.

We claim:

1. A fouling and stiction-resistant coating, comprising:
   a silicone undercoat layer; and
   a powdery topcoat layer on said silicone undercoat layer, said coating adapted for application to a surface that is subject to fouling;
   said powdery topcoat layer arranged to be penetrable by the feet of barnacles that come into contact with said powdery topcoat layer, and said silicone undercoat layer arranged such that at least some of the barnacles' feet that penetrate said powdery topcoat layer bond with said silicone undercoat layer;
   said powdery topcoat layer further arranged to peel away from said silicone undercoat layer when force is applied to barnacles which have penetrated said powdery topcoat layer to remove them from said coating;
   such that said coating both resists fouling in the presence of marine life and reduces stiction between surfaces to which said coating has been applied.

2. The coating of claim 1, wherein said powdery topcoat layer is a fluoropolymer.

3. The coating of claim 2, wherein said fluoropolymer is not continuous.

4. The coating of claim 2, wherein said fluoropolymer is non-toxic.

5. The coating of claim 2, wherein said fluoropolymer is non-uniform and hydrophobic.

6. The coating of claim 2, wherein said fluoropolymer is a tetrafluoropolymer.

7. The coating of claim 2, wherein said powdery topcoat layer has a thickness of 100 nm-1 micron.

8. The coating of claim 2, wherein said fluoropolymer is selected from a group consisting of polytetrafluoroethylene (PTFE) (Teflon), fluorinated ethylene propylene (FEP), polyfluoroalkoxy (PFA), ethylene tetrafluoroethylene (ETFE), and ethylene chlorotrifluoroethylene (ECTFE).

9. The coating of claim 1, wherein said silicone undercoat layer has a thickness of 50 microns-500 microns.

10. The coating of claim 1, wherein said silicone undercoat layer comprises a UV-cured silicone, a room temperature-cured silicone (RTV), or a thermally cured silicone.

11. The coating of claim 1, further comprising a primer layer under said silicone undercoat layer.

12. The coating of claim 11, wherein said primer layer has a thickness of 10 nm-10 microns.

13. The coating of claim 11, wherein said primer layer comprises an epoxy-modified siloxane.

14. The coating of claim 11, further comprising a substrate layer under said primer layer, said primer layer arranged to improve the adhesion of said silicone undercoat layer to said substrate layer.

15. The coating of claim 1, further comprising a substrate layer under said silicone undercoat layer.

16. The coating of claim 15, wherein said substrate layer comprises polyurethane.

17. The coating of claim 15, wherein said substrate layer has a thickness of 1 mm-1 cm.

18. The coating of claim 1, further comprising a cable on which said coating is applied.

19. The coating of claim 18, wherein said cable is a marine streamer, said coating arranged to reduce stiction between streamer sections when said streamer is spooled.

20. A marine streamer with a fouling and stiction-resistant coating, comprising:
   a substrate layer;
   a primer layer on said substrate layer;
   a silicone undercoat layer on said primer layer; and
   a powdery topcoat layer on said undercoat layer;
   said coating arranged to resist fouling and to reduce stiction between streamer sections when said streamer is spooled;
   said powdery topcoat layer arranged to be penetrable by the feet of barnacles that come into contact with said powdery topcoat layer, and said silicone undercoat layer arranged such that at least some of the barnacles feet' that penetrate said powdery topcoat layer bond with said silicone undercoat layer;
   said powdery topcoat layer further arranged to peel away from said silicone undercoat layer when force is applied to barnacles which have penetrated said topcoat to remove them from said streamer.

* * * * *